US011314848B2

(12) United States Patent
Lillie et al.

(10) Patent No.: US 11,314,848 B2
(45) Date of Patent: Apr. 26, 2022

(54) SYSTEM FOR DYNAMICALLY APPENDING AND TRANSFORMING STATIC ACTIVITY DATA TRANSMITTED TO A USER DEVICE APPLICATION

(71) Applicant: BANK OF AMERICA CORPORATION, Charlotte, NC (US)

(72) Inventors: Christina Ann Lillie, Ann Arbor, MI (US); Justin Riley DuPont, Charlotte, NC (US); Malathi Jivan, San Jose, CA (US); Heather Dolan, Sarasota, FL (US); Poppy Marie Kimball, Redwood City, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 403 days.

(21) Appl. No.: 16/557,497

(22) Filed: Aug. 30, 2019

(65) Prior Publication Data

US 2021/0067460 A1 Mar. 4, 2021

(51) Int. Cl.
*H04L 9/14* (2006.01)
*H04L 9/32* (2006.01)
(Continued)

(52) U.S. Cl.
CPC .......... *G06F 21/30* (2013.01); *G06Q 20/382* (2013.01); *G06Q 20/40* (2013.01); *H04L 9/006* (2013.01);
(Continued)

(58) Field of Classification Search
CPC ..... G06F 9/468; G06F 21/564; H04L 67/101; H04L 67/1008; H04L 47/808; H04L 47/801; H04L 5/0053; G06Q 10/047
See application file for complete search history.

(56) References Cited

U.S. PATENT DOCUMENTS 6,076,074 A    6/2000  Cotton et al.
6,298,335 B1  10/2001  Bernstein
(Continued)

FOREIGN PATENT DOCUMENTS

WO    2017014815 A1    1/2017

OTHER PUBLICATIONS

U.S. Appl. No. 16/262,656, filed Jan. 30, 2019.
(Continued)

*Primary Examiner* — Iqbal Zaidi
(74) *Attorney, Agent, or Firm* — Moore & Van Allen PLLC; Vaidehi Bachoti

(57) ABSTRACT

Embodiments of the invention are directed to a system, method, and computer program product for dynamically appending and transforming static activity data transmitted to a user device application. In particular, the invention provides a secure platform for dynamic restructuring and inter-connection of inline activity data. The system first determines that a first user, via a first networked device, has initiated a first electronic activity. The system then constructs and transmits a first static activity data set to a second resource application of the second networked device associated with the second user. The system then alters the transmitted first static activity data set of the first electronic activity, in response to the second user modifying an activity parameter item of the first electronic activity, in situ, prior to finalization authorization processing of the first electronic activity by a recipient system, without requiring initialization of an additional electronic activity.

17 Claims, 5 Drawing Sheets

(51) Int. Cl.
  *G06Q 20/40* (2012.01)
  *G06Q 20/38* (2012.01)
  *G06F 21/30* (2013.01)
  *H04L 9/00* (2022.01)
  *H04L 9/08* (2006.01)
  *H04L 9/30* (2006.01)

(52) U.S. Cl.
  CPC .............. *H04L 9/08* (2013.01); *H04L 9/0861* (2013.01); *H04L 9/14* (2013.01); *H04L 9/30* (2013.01); *H04L 9/32* (2013.01); *H04L 2209/56* (2013.01)

(56) References Cited

U.S. PATENT DOCUMENTS

| | | |
|---|---|---|
| 6,594,647 B1 | 7/2003 | Randle et al. |
| 7,376,587 B1 | 5/2008 | Neofytides et al. |
| 7,765,148 B2 | 7/2010 | German et al. |
| 7,836,088 B2 | 11/2010 | Chavda et al. |
| 8,165,381 B1 | 4/2012 | Ferris et al. |
| 8,401,904 B1 | 3/2013 | Simakov et al. |
| 8,626,592 B2 | 1/2014 | Simakov et al. |
| 8,630,945 B1 | 1/2014 | Sun et al. |
| 8,666,907 B1 | 3/2014 | Wang et al. |
| 8,818,884 B2 | 8/2014 | Marschall et al. |
| 9,990,613 B1 | 6/2018 | Bhatt et al. |
| 10,019,711 B1 | 7/2018 | Lerner |
| 10,223,688 B2 | 3/2019 | Fahn et al. |
| 2002/0152133 A1 | 10/2002 | King et al. |
| 2003/0154164 A1 | 8/2003 | Mascavage, III et al. |
| 2004/0139008 A1 | 7/2004 | Mascavage, III |
| 2007/0150387 A1 | 6/2007 | Seubert et al. |
| 2009/0313143 A1 | 12/2009 | Darensbourg et al. |
| 2010/0082481 A1 | 4/2010 | Lin et al. |
| 2010/0138269 A1 | 6/2010 | Cirpus et al. |
| 2012/0136781 A1 | 5/2012 | Fridman et al. |
| 2012/0197794 A1 | 8/2012 | Grigg et al. |
| 2014/0114852 A1 | 4/2014 | Rajagopal et al. |
| 2014/0344150 A1 | 11/2014 | Kapur |
| 2015/0348151 A1 | 12/2015 | Francis |
| 2016/0117666 A1 | 4/2016 | Davis et al. |
| 2016/0140554 A1 | 5/2016 | Sun |
| 2016/0180302 A1 | 6/2016 | Bagot, Jr. |
| 2017/0200209 A1 | 7/2017 | Cheng et al. |
| 2017/0346889 A1* | 11/2017 | Zhuang .............. H04L 67/1008 |
| 2017/0364895 A1 | 12/2017 | Van Heerden et al. |
| 2018/0189754 A1 | 7/2018 | Campbell et al. |

OTHER PUBLICATIONS

U.S. Appl. No. 16/262,669, filed Jan. 30, 2019.
Quain, S., How to Stop a PayPal Transaction in Progress, Aug. 10, 2018, https://smallbusiness.chron.com/stop-paypal-transaction-progress-53425.html.

* cited by examiner

SYSTEM FOR DYNAMICALLY APPENDING AND TRANSFORMING STATIC ACTIVITY DATA TRANSMITTED TO A USER DEVICE APPLICATION

FIELD OF THE INVENTION

The present invention is directed to, in general, a novel, proactive approach for securely preforming electronic activities. Specifically, embodiments of the invention are directed to dynamic restructuring and inter-connection of inline activity data, in-situ during finalization authorization of an electronic activity without requiring initialization of an additional electronic activity.

BACKGROUND

Over the last few years, there has been a significant increase in the number of electronic activities, due to widespread use of smartphone, tablet computers, laptop computers, transaction terminals, and electronic computing devices in general. Typically, certain electronic activities require a chain of transmissions, e.g., a first transmission from an originating first networked device to an authorizing second networked device, and a subsequent second transmission from the second networked device to a processing recipient system. However, in conventional systems the activity data that is transmitted from the originating first networked device to an authorizing second networked device cannot be modified by the second networked device, before the subsequent transmission to the processing recipient system. If the parameters of the first electronic activity are required to be modified after the originating first networked device has initiated the transmission, the only recourse in conventional systems, if at all possible, is to end the first electronic activity and start a second electronic activity all over again with the new parameters. This results in increased processing delays, and squandered processing resources. Moreover, the delay in restarting with a second electronic activity may adversely affect the time-sensitive electronic activities.

Accordingly, there is a need for systems and methods for dynamically appending and transforming transmitted static activity data for an electronic activity, without requiring ending of the electronic activity and restarting with an additional electronic activity. The previous discussion of the background to the invention is provided for illustrative purposes only and is not an acknowledgement or admission that any of the material referred to is or was part of the common general knowledge as at the priority date of the application.

SUMMARY

The present invention provides a novel solution to the foregoing shortcomings of conventional systems and provides improvements to technology by dynamically appending and transforming static activity data transmitted to a user device application. The present invention not only dynamic restructuring and inter-connection of inline activity data, in-situ during finalization authorization of an electronic activity, but also precludes the need for undesirable initialization of an additional electronic activity. In one aspect, the present invention is directed to in general a system for dynamically appending and transforming static activity data transmitted to a user device application, a corresponding method, and computer program product. The system typically includes at least one processing device operatively coupled to at least one memory device and at least one communication device connected to a distributed network. The system also typically includes a module stored in the at least one memory device comprising executable instructions that when executed cause the processing device and hence the system to perform one or more functions described below. In one embodiment, the system is configured to: determine, based on receiving a first transmission from a first resource application of a first networked device, that a first user associated with the first networked device has requested finalization authorization of a first electronic activity, wherein the first electronic activity is associated with a first resource transfer from a second resource associated with a second user to a first resource associated with the first user; construct a first static activity data set associated with the first electronic activity, wherein the first static activity data set comprises a plurality of first activity parameter items; transmit the first static activity data set to a second resource application of the second networked device associated with the second user; present, via a second user interface of the second resource application, the plurality of first activity parameter items of the first static activity data set on the second networked device associated with the second user; receive, via the second user interface of the second resource application, a first user input from the second user for altering a resource magnitude type activity parameter item of the plurality of first activity parameter items for the first electronic activity; in response to the receiving the second user input, construct a second static activity data set associated with altering the resource magnitude type activity parameter item of the plurality of first activity parameter items for the first electronic activity; transmit the second static activity data set to the first resource application of the first networked device, wherein the transmission of the second static activity data set is structured to present the altered resource magnitude type activity parameter item to the first user, via a first user interface of the first resource application; alter the first static activity data set based on receiving an alteration validation of the second static activity data set from the first resource application of the first networked device; transmit the altered first static activity data set to the recipient system, wherein the first static activity data set, when processed, is structured to cause the recipient system to perform the first electronic activity based on the altered first static activity data set; and present, to the first user via the first resource application and to the second user via the second resource application, a notification indicating the completion of the first electronic activity based on receiving an activity communication from the recipient system.

In another embodiment, and in combination with any of the previous embodiments, altering the first static activity data, further comprises: parsing the second static activity data set associated with altering the resource magnitude type activity parameter item of the plurality of first activity parameter items for the first electronic activity; and based on determining that the second activity data set is associated with an increase in the resource magnitude type activity parameter item, automatically transmitting the alteration validation of the second static activity data set.

In another embodiment, and in combination with any of the previous embodiments, altering the first static activity data set, further comprises: parsing the second static activity data set associated with altering the resource magnitude type activity parameter item of the plurality of first activity parameter items for the first electronic activity; and based on determining that the second activity data set is associated with a decrease in the resource magnitude type activity parameter item, presenting, via the first user interface of the first resource application, a request for the alteration validation of the second static activity data set from the first user.

In another embodiment, and in combination with any of the previous embodiments, altering the first static activity data set further comprises: receiving, via the first user interface of the first resource application, a second user input from the first user for altering the second static activity data set, in response to presenting the request for the alteration validation of the second static activity data set from the first user; in response to the receiving the second user input, construct a third static activity data set by altering the second static activity data set; transmit the third static activity data set to the second resource application of the second networked device, wherein the transmission of the third static activity data set is structured to present the third static activity data set to the second user, via the second user interface of the second resource application; and altering the first static activity data set in response to receiving a confirmation from the second user, via the second user interface of the second resource application.

In another embodiment, and in combination with any of the previous embodiments, constructing the second static activity data set associated with altering the resource magnitude type activity parameter item of the plurality of first activity parameter items further comprises: in response to the receiving the first user input from the second user, constructing at least one second activity parameter item associated with altering the resource magnitude type activity parameter item of the plurality of first activity parameter items; and constructing the second static activity data set associated with the first electronic activity, wherein the second static activity data set comprises (i) the at least one second activity parameter item associated with altering the resource magnitude type activity parameter item of the plurality of first activity parameter items, and (ii) a unique activity identifier parameter item of the plurality of first activity parameter items.

In another embodiment, and in combination with any of the previous embodiments, altering the first static activity data set further comprises: removing the resource magnitude type activity parameter item of the plurality of first activity parameter items from the first activity data set; and appending the at least one second activity parameter item at a predetermined location in the plurality of first activity parameter items of the first activity data set.

In another embodiment, and in combination with any of the previous embodiments, presenting the altered resource magnitude type activity parameter item to the first user, via the first user interface of the first resource application, further comprises: parsing the second static activity data set to identify the unique activity identifier parameter item of the plurality of first activity parameter items; associating the second static activity data set with the first electronic activity; presenting, via the first user interface of the first resource application, the at least one second activity parameter item associated with altering the resource magnitude type activity parameter item of the plurality of first activity parameter items to the first user; and presenting, via the first user interface of the first resource application, a request for the alteration validation of the second static activity data set from the first user.

In another embodiment, and in combination with any of the previous embodiments, associating the second static activity data set with the first electronic activity further comprises: retrieving the constructed first static activity data set associated with the first electronic activity, wherein the first static activity data set comprises the plurality of first activity parameter items comprising the resource magnitude type activity parameter item. Moreover, presenting, via the first user interface of the first resource application, the at least one second activity parameter item further comprises: presenting the plurality of first activity parameter items comprising the resource magnitude type activity parameter item; and overlaying a presentation of the at least one second activity parameter item comprising a graphical link to the presented the resource magnitude type activity parameter item.

In another embodiment, and in combination with any of the previous embodiments, altering the first static activity data set further comprises: receiving, via the first user interface of the first resource application, a second user input from the first user for altering the at least one second activity parameter item of the second static activity data set associated with altering the resource magnitude type activity parameter item of the plurality of first activity parameter items; in response to the receiving the second user input from the first user, constructing at least one third activity parameter item associated with the second user input for altering the at least one second activity parameter item; constructing a third static activity data set associated with the first electronic activity, wherein the second static activity data set comprises (i) the at least one third activity parameter item associated with the second user input for altering the at least one second activity parameter item, and (ii) the unique activity identifier parameter item of the plurality of first activity parameter items; transmitting the third static activity data set to the second resource application of the second networked device, wherein the transmission of the third static activity data set is structured to present the at least one third activity parameter item to the second user, via the second user interface of the second resource application; and altering the first static activity data set in response to receiving a confirmation from the second user associated with the at least one third activity parameter item, via the second user interface of the second resource application, by: (i) removing the resource magnitude type activity parameter item of the plurality of first activity parameter items from the first activity data set; and (ii) appending the at least one third activity parameter item at a predetermined location in the plurality of first activity parameter items of the first activity data set.

In another embodiment, and in combination with any of the previous embodiments, the at least one third activity parameter item to the second user, via the second user interface of the second resource application, further comprises: parsing the third static activity data set to identify the unique activity identifier parameter item of the plurality of first activity parameter items; associating the third static activity data set with the first electronic activity; presenting, via the first user interface of the first resource application, the at least one second activity parameter item associated with altering the resource magnitude type activity parameter item of the plurality of first activity parameter items to the first user; and presenting, via the first user interface of the first resource application, a request for the alteration validation of the second static activity data set from the first user.

In another embodiment, and in combination with any of the previous embodiments, constructing the first static activity data set associated with the first electronic activity further comprises: storing the first static activity data set comprising the plurality of first activity parameter items at a first memory device of the first networked device; and generating a first authorization instruction associated with the first electronic activity for the recipient system, wherein the first authorization instruction comprises a processing instruction for the recipient system to perform the first electronic activity.

In another embodiment, and in combination with any of the previous embodiments, transmitting the altered first static activity data set to the recipient system further comprises: generating a second authorization instruction for the first electronic activity, wherein the second authorization instruction is structured to modify the processing instruction for the recipient system based on the altered first static activity data set; and transmitting the second authorization instruction for the first electronic activity to the recipient system, wherein the second authorization instruction, when processed, is structured to cause the recipient system to perform the first electronic activity based on the altered first static activity data set.

In another embodiment, and in combination with any of the previous embodiments, the plurality of first activity parameter items of the first static activity data set associated with the first electronic activity comprise a first user annotation item, wherein the first user annotation item is input by the first user, wherein the first user annotation item is in a natural language format.

In another embodiment, and in combination with any of the previous embodiments, the second static activity data set associated with the first electronic activity comprises a second user annotation item, wherein the second user annotation item is input by the second user, wherein the second user annotation item is in a natural language format.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
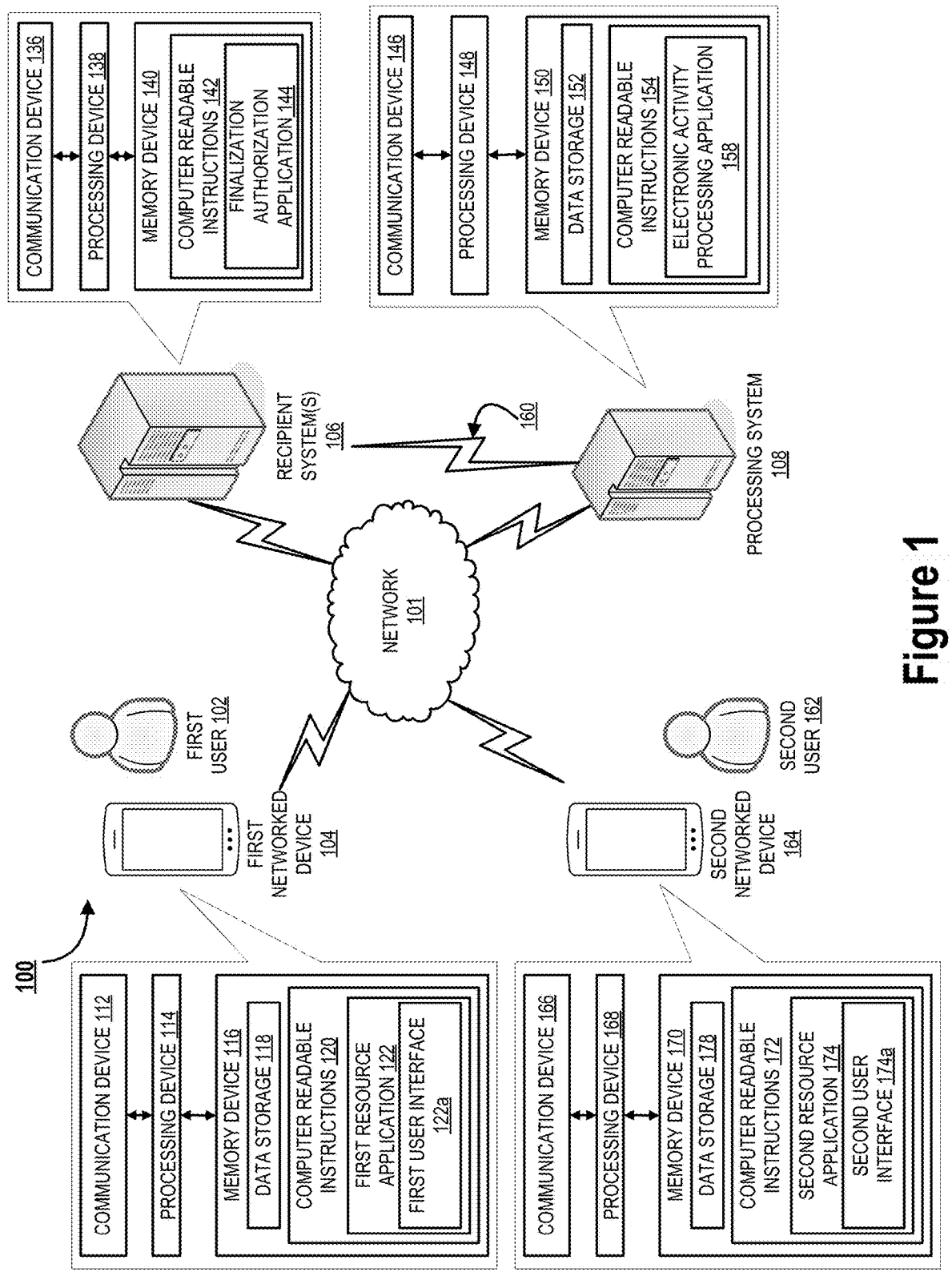
Figure 2:
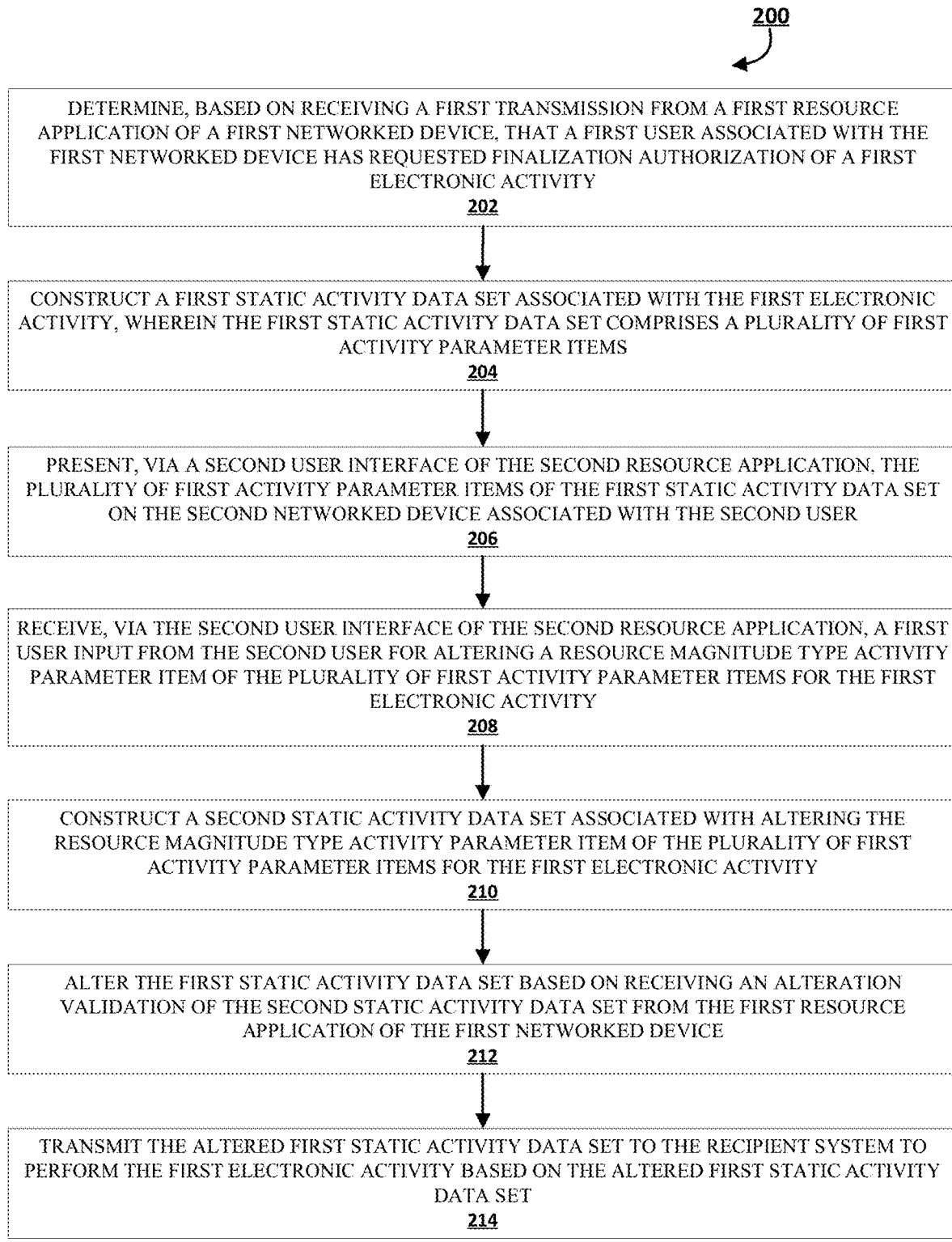
Figure 3A:
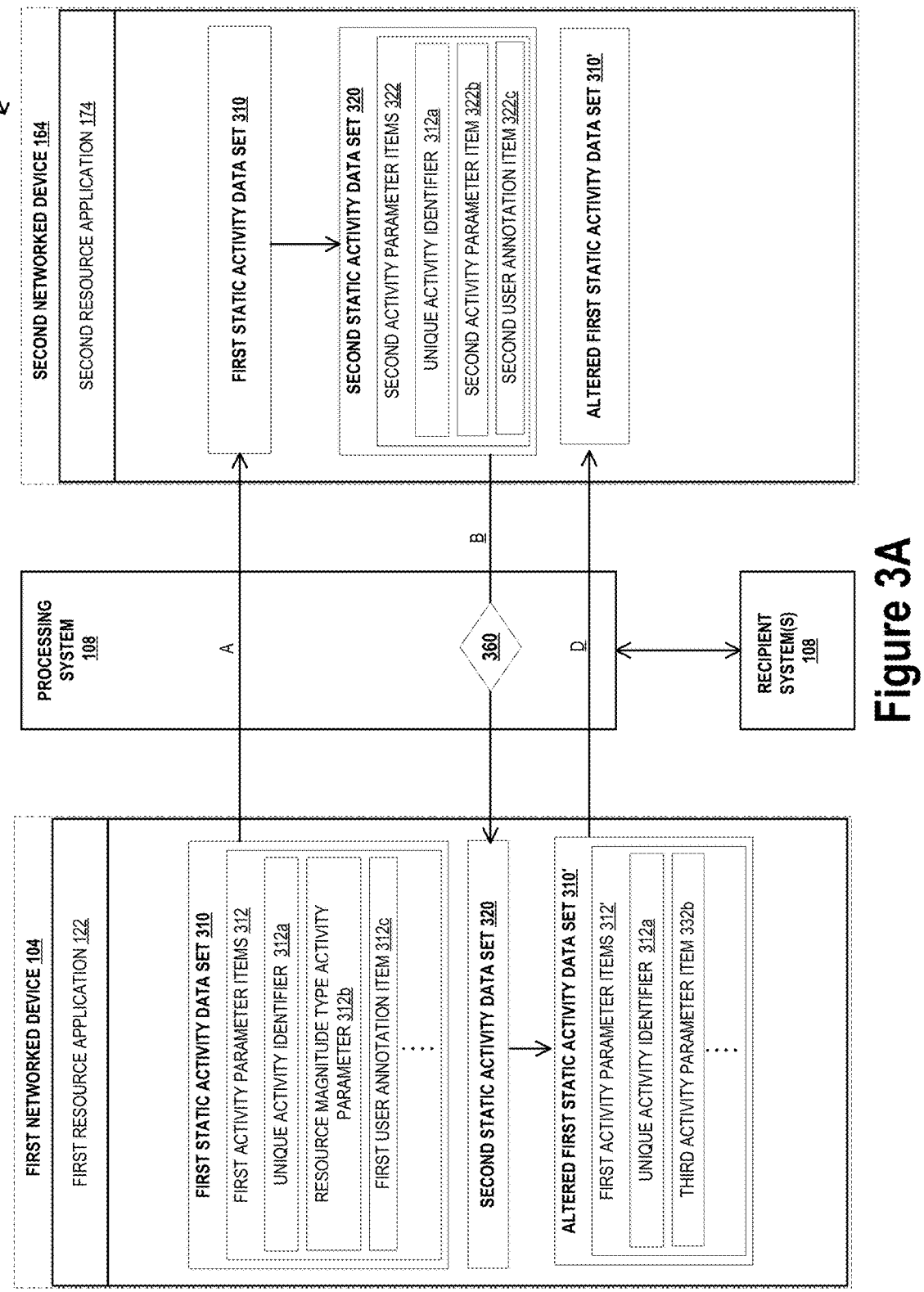
Figure 3B:
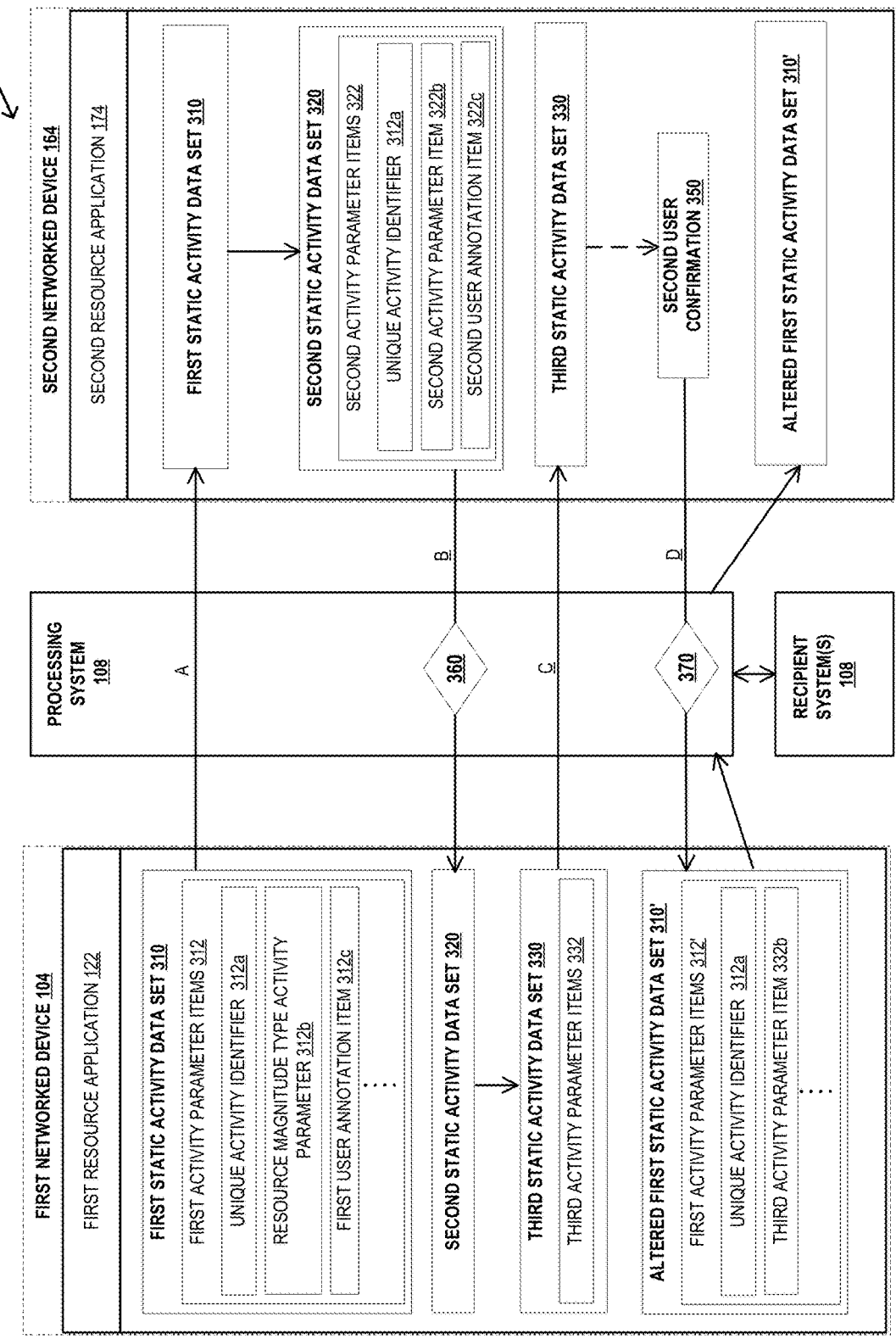
Figure 4:
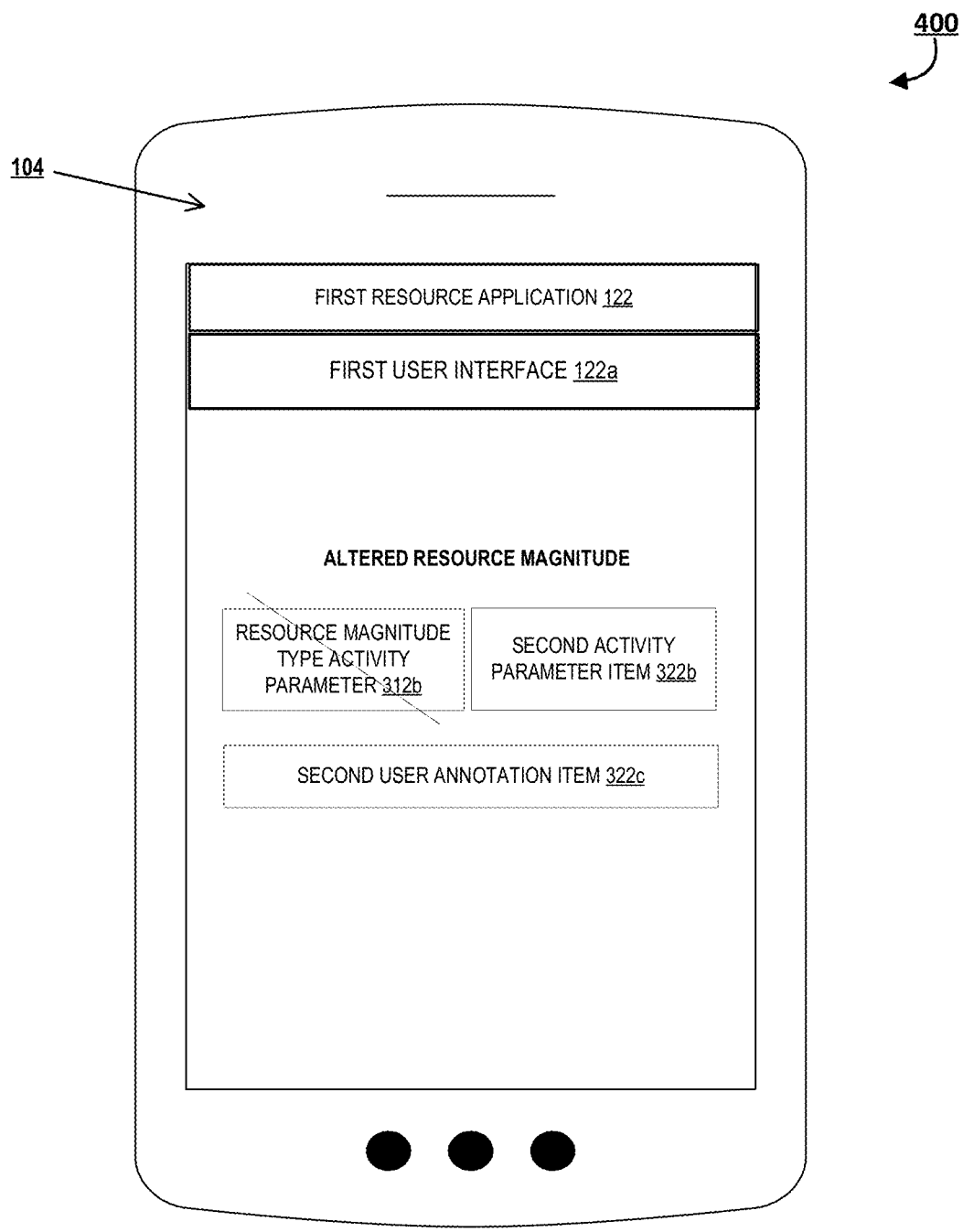

Having thus described embodiments of the invention in general terms, reference will now be made the accompanying drawings, wherein:

FIG. 1 schematically depicts an electronic activity processing system and environment 100, in accordance with an aspect of the present invention;

FIG. 2 schematically depicts a high level process flow for dynamically appending and transforming static activity data of electronic activities, in accordance with some embodiments of the invention;

FIG. 3A schematically depicts an illustrative representation and processing environment 300A of dynamically appending and transforming static activity data of electronic activities, in accordance with some embodiments of the invention;

FIG. 3B schematically depicts an illustrative representation 300B and processing environment of dynamically appending and transforming static activity data of electronic activities, in accordance with some embodiments of the invention; and FIG. 4 schematically depicts an illustrative representation 400 of a resource application user interface, in accordance with some embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" refers to an organization, a company, a group, an institute, a business or the like associated with initiating and/or performing electronic activities. Typically, the entity comprises systems, devices, applications and/or the like for initiating and/or performing electronic activities. In some embodiments, the entity initiates and/or performs electronic activities in response to receiving instructions from an associated user. In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by an entity. In other embodiments, an "entity" may not be a financial institution. Examples for non-financial entities include cloud computing systems, database systems, block chain systems for data processing, and the like.

Unless specifically limited by the context, an "electronic activity", "user activity", "transaction" or "activity" refers to activities associated with electronic resources, such as the user's resources. In some embodiments, the electronic activity refers to resource transfers between resources, e.g., a transfer of a resource value from a first resource and a second resource. For example, the electronic activity may refer to transmission of resource value comprising predetermined data (e.g. files, text, images, and the like) from a first resource (e.g., a user device, a database, a server, a cloud storage system, and the like) to a second resource (e.g., another device, database, and the like). Typically, a first system (e.g., a user device or a networked device), for example, based on receiving instructions from a user, transmits activity parameters (e.g., location of the file, time of transmission, unique identifier of the source resource system, certificates of the target resource system, authentication information, and the like) to a recipient system (e.g., a system associated with one or more of the resources, an entity system, and the like) which then performs the electronic activity (transfer of the file from the source resource system to the target resource system). As another example, in some embodiments, the electronic activity refers to transfer of a resource value comprising financial resources (e.g. a predetermined transfer amount) from a first resource (e.g., a source user account) to a second resource (e.g., another target account). Typically, a first system (e.g., a user device), for example, based on receiving instructions from a user, transmits activity parameters (e.g., the transfer amount, time and date of the transfer, unique identifiers of the source user account and the target user account, and the like) to a recipient system (e.g., a financial institution associated with the source account and/or the target account) which then performs the electronic activity (transfer of the predetermined amount from the source user account to the target account).

As such, in some embodiments, an electronic activity or a user activity may refer to a purchase of goods or services, a return of goods or services, a payment transaction, a credit transaction, or other interaction involving a user's resources (e.g., a bank account). As another example, in some embodiments, a user activity may refer to viewing account balances, modifying user information and contact information associated with an account, modifying alert/notification preferences, viewing transaction/activity history, transferring/redeeming loyalty points and the like. In some embodiments, the user activity is associated with an entity application stored on a user device, for example, a digital wallet application, a mobile/online banking application, a merchant application, a browser application, a social media application and the like. Typically, a user activity is an electronic transaction or electronic activity in which the user is employing a mobile device, computing device, or other electronic device to initiate, execute and/or complete the activity.

As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a user activity or transaction may refer to one or more of a sale of goods and/or services, an account balance inquiry, a rewards transfer, an account money transfer, opening a bank application on a user's computer or mobile device, a user accessing their e-wallet (e.g., mobile wallet) or online banking account or any other interaction involving the user and/or the user's device that is detectable by the financial institution. As further examples, a user activity may occur when an entity associated with the user is alerted via the transaction of the user's location. A user activity may occur when a user accesses a building, uses a rewards card, and/or performs an account balance query. A user activity may occur as a user's device establishes a wireless connection, such as a Wi-Fi connection, with a point-of-sale terminal. In some embodiments, a user activity may include one or more of the following: purchasing, renting, selling, and/or leasing goods and/or services (e.g., groceries, stamps, tickets, DVDs, vending machine items, and the like); withdrawing cash; making payments (e.g., paying monthly bills; paying federal, state, and/or local taxes; and the like); sending remittances; transferring balances from one account to another account; loading money onto stored value cards (SVCs) and/or prepaid cards; donating to charities; and/or the like.

As used herein, an "online banking account" is an account that is associated with one or more user accounts at a financial institution. For example, the user may have an online banking account that is associated with the user's checking account, savings account, investment account, and/or credit account at a particular financial institution. Authentication credentials comprising a username and password are typically associated with the online banking account and can be used by the user to gain access to the online banking account. The online banking account may be accessed by the user over a network (e.g., the Internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

A "user" may be an individual or group of individuals associated with an entity that provides the system for assessing network authentication requirements based on situational instance. In some embodiments, the "user" may be a financial institution user (e.g., an account holder or a person who has an account (e.g., banking account, credit account, or the like)). In one aspect, a user may be any financial institution user seeking to perform user activities associated with the financial institution or any other affiliate entities associated with the financial institution. In some embodiments, the user may be an individual who may be interested in opening an account with the financial institution. In some other embodiments, a user may be any individual who may be interested in the authentication features offered by the financial institution/entity. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably.

With advancements in technology infrastructures and wireless communication implementation, electronic devices such as transaction terminals such as point of sale terminals, portable multi-function devices, such as laptop computers, tablet computers, mobile phones, smart phones, wearable devices and the like are common. Typically, individuals may also have a mobile user device with them. These electronic devices may enable performance of user activities (e.g., financial activities, purchases, resource transfers, accessing resource data stored at other systems and databases and the like) based on requisite authorization. These electronic devices may also be configured to allow the user to perform the one or more user activities, transactions or resource transfers through an application, accept authentication credentials from the user, transmit authentication credentials for validation at external systems, etc.

Embodiments of the present invention address the above needs and/or achieve other advantages by providing apparatuses (e.g., a system, computer program product and/or other devices) and methods for dynamically appending and transforming static activity data transmitted to a user device application, as will be described in detail elsewhere in the specification. FIG. 1 illustrates an electronic activity processing system environment 100, in accordance with some embodiments of the present invention. FIG. 1 provides a unique system that includes specialized servers and systems, communicably linked across a distributive network of nodes required to perform the functions of dynamically appending and transforming static activity data transmitted to a user device application. The authentication system provides a secure platform for dynamic restructuring and inter-connection of inline activity data, in-situ during finalization authorization of an electronic activity without requiring initialization of an additional electronic activity.

As illustrated in FIG. 1, a processing system 108, or electronic activity processing system 108 or application server (e.g., a financial institution system 108) is operatively coupled, via a network 101 to user devices such as a first networked device 104, a second networked device 164, etc., to the recipient system 106 (e.g., another second financial institution system 106) and/or to one or more secondary systems. In this way, the processing system 108 can send information to and receive information from the user devices such as a first networked device 104, a second networked device 164, etc., the recipient system 106, and one or more secondary systems. FIG. 1 illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, the network 101 may enable communication between devices thorough near-field communication, transmission of electromagnetic waves, sound waves or any other suitable means.

In some embodiments, the first user 102 is an individual that has a user device, i.e., the first networked device 104, such as a mobile phone, tablet, or the like and who seeks to perform one or more electronic activities or user activities. In some embodiments, the second user 162 is another individual that has a user device, i.e., the second networked device 164, such as a mobile phone, tablet, or the like and who seeks to perform one or more electronic activities or user activities.

FIG. 1 also illustrates the first networked device 104. The first networked device 104 (also referred to as a first user device or a user device, typically associated with the first user 102) may refer to a device or a combination of devices that are configured to capture (i.e., receive and/or process) one or more instructions, inputs, authentication credentials, and the like from the user 102 such as a computing device (e.g., a mobile device, a smart phone, a laptop computer and/or another computing device), smart devices (e.g., smart TVs, smart doors, smart speakers, personal digital assistant devices), wearable devices (e.g., smart watches, fitness devices, virtual/augmented reality devices), GPS devices, proximity/location sensors/beacon devices, visual capture devices and/or the like to capture authentication credentials associated with the user. The first networked device 104 may be, for example, a desktop personal computer, a mobile system, such as a cellular phone, smart phone, personal data assistant (PDA), laptop, or the like. The first networked device 104 generally comprises a communication device 112 comprising input/output devices and/or sensors, a processing device 114, and a memory device 116. The first networked device 104 may comprise other devices that are not illustrated, configured for location determination/navigation (GPS devices, accelerometers and the like), for authentication (fingerprint scanners, microphones, iris scanners and the like), for image capture (cameras, AR devices and the like), for display (screens, hologram projectors and the like), and other purposes. The first networked device 104 is a computing system that enables the user to perform one or more user activities, e.g., initiating one or more electronic activities for resource transfers, payment requests, etc. The processing device 114 is operatively coupled to the communication device 112 and the memory device 116. The processing device 114 uses the communication device 112 to communicate with the network 101 and other devices on the network 101, such as, but not limited to the processing system 108. As such, the communication device 112 generally comprises a modem, server, or other device for communicating with other devices on the network 101.

The first networked device 104 (also referred to as a first user device or a user device, typically associated with the first user 102) comprises computer-readable instructions 120 and data storage 118 stored in the memory device 116, which in one embodiment includes the computer-readable instructions 120 of a first resource application 122. In some embodiments first networked device 104 may refer to multiple user devices that may be configured to communicate with each other, with the processing system and/or other systems via the network 101. In some embodiments, the processing system 108 transmits the application 122 to and/or causes the processing device 114 to install/store the first resource application 122 on the first networked device 104. In some embodiments, the first resource application 122, when executed by the processing device 114 is configured to cause the first networked device 104 to perform one or more steps described herein. In some embodiments, the first resource application 122 is similar to the electronic activity processing application 158 described below. The first resource application 122 may be a standalone application configured for receiving activity data/instructions associated with an electronic activity from a user (typically via the first user interface 122a of the first resource application 122), transmitting electronic activity data and/or generating a static activity data set as described herein, or the first resource application 122 may refer to one or more existing applications on the user device that are configured to perform one or more of these steps. In some embodiments, the first resource application 122 associated with the first user 102 may be associated with a payment network application structured for person-to person (P2P) payments and/or real time resource transfers, with the second user 162 being a part of the same payment network and having a corresponding payment network application structured for person-to person (P2P) payments and/or real time resource transfers (second resource application 174). In some embodiments the processing system 108 and/or a financial institution system may transmit control signals to the user device, configured to cause the first resource application 122 to perform one or more functions or steps associated with electronic activity processing, for example, causing the application to trigger one or more sensors or input devices of the first networked device 104 to capture an authentication credential based on instructions receiving in an capture signal from the processing system 108, to cause the first networked device 104 to request user input/information from the first user 102, and the like.

FIG. 1 also illustrates the second networked device 164. The second networked device 164 (also referred to as a second user device or a user device, typically associated with the second user 162) may refer to a device or a combination of devices that are configured to capture (i.e., receive and/or process) one or more instructions, inputs, authentication credentials, and the like from the second user 162 such as a computing device (e.g., a mobile device, a smart phone, a laptop computer and/or another computing device), smart devices (e.g., smart TVs, smart doors, smart speakers, personal digital assistant devices), wearable devices (e.g., smart watches, fitness devices, virtual/augmented reality devices), GPS devices, proximity/location sensors/beacon devices, visual capture devices and/or the like to capture authentication credentials associated with the user. The second networked device 164 may be, for example, a desktop personal computer, a mobile system, such as a cellular phone, smart phone, personal data assistant (PDA), laptop, or the like. The second networked device 164 generally comprises a communication device 162 comprising input/output devices and/or sensors, a processing device 168, and a memory device 170. The second networked device 164 may comprise other devices that are not illustrated, configured for location determination/navigation (GPS devices, accelerometers and the like), for authentication (fingerprint scanners, microphones, iris scanners and the like), for image capture (cameras, AR devices and the like), for display (screens, hologram projectors and the like), and other purposes. The second networked device 164 is a computing system that enables the user to perform one or more user activities, e.g., initiating one or more electronic activities for resource transfers, payment requests, etc. The processing device 168 is operatively coupled to the communication device 162 and the memory device 170. The processing device 168 uses the communication device 162 to communicate with the network 101 and other devices on the network 101, such as, but not limited to the processing system 108. As such, the communication device 162 generally comprises a modem, server, or other device for communicating with other devices on the network 101.

The second networked device 164 (also referred to as a second user device or a user device, typically associated with the second user 162) comprises computer-readable instructions 172 and data storage 178 stored in the memory device 170, which in one embodiment includes the computer-readable instructions 172 of a second resource application 174. In some embodiments second networked device 164 may refer to multiple user devices that may be configured to communicate with each other, with the processing system and/or other systems via the network 101. In some embodiments, the processing system 108 transmits the application 174 to and/or causes the processing device 168 to install/store the second resource application 174 on the user device 164. In some embodiments, the second resource application 174, when executed by the processing device 168 is configured to cause the second networked device 164 to perform one or more steps described herein. In some embodiments, the second resource application 174 is similar to the electronic activity processing application 158 described below. The second resource application 174 may be a standalone application configured for receiving activity data/instructions associated with an electronic activity from a user (typically via the second user interface 174a of the second resource application 174), transmitting electronic activity data and/or generating a static activity data set as described herein, or the second resource application 174 may refer to one or more existing applications on the user device that are configured to perform one or more of these steps. In some embodiments, the second resource application 174 associated with the second user 162 may be associated with a payment network application structured for person-to person (P2P) payments and/or real time resource transfers, with the first user 102 being a part of the same payment network and having a corresponding payment network application structured for person-to person (P2P) payments and/or real time resource transfers (first resource application 122). In some embodiments the processing system 108 and/or a financial institution system may transmit control signals to the user device, configured to cause the second resource application 174 to perform one or more functions or steps associated with electronic activity processing, for example, causing the application to trigger one or more sensors or input devices of the second networked device 164 to capture an authentication credential based on instructions receiving in an capture signal from the processing system 108, to cause the second networked device 164 to request user input/information from the second user 162, and the like.

As further illustrated in FIG. 1, the processing system 108 or the electronic activity processing system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the network 101 and other devices on the network 101, such as, but not limited to the recipient system 106, the user device(s) 104 and the secondary system(s) 110. As such, the communication device 146 generally comprises a modem, server, or other device for communicating with other devices on the network 101.

As further illustrated in FIG. 1, the processing system 108 comprises computer-readable instructions 154 stored in the memory device 150, which in one embodiment includes the computer-readable instructions 154 of an electronic activity processing application 158. In some embodiments, the memory device 150 includes data storage 152 for storing data related to the system environment, but not limited to data created and/or used by the electronic activity processing application 158. In some embodiments, executing the computer readable instructions of the electronic activity processing application 158 causes the processing device 148 to perform one or more steps for electronic activity processing described herein. In the embodiment illustrated in FIG. 1 and described throughout much of this specification, the electronic activity processing application 158 may receive electronic activity data from the user devices, i.e., the first networked device 104 and the second networked device 164. In some embodiments, the processing system 108 may retrieve user authentication information, capture device information, financial information and the like from the user devices (first networked device 104 and the second networked device 164) and/or the recipient system 106. In this way, the electronic activity processing application 158 may communicate with the recipient system 106, the user devices (first networked device 104 and the second networked device 164), secondary system 110, merchant systems and other third party systems.

In some embodiments, the electronic activity processing application 158 may control the functioning of the first networked device 104 and the second networked device 164. In some embodiments, the electronic activity processing application 158 computer readable instructions 154 or computer-readable program code, the when executed by the processing device 148, causes the processing device to perform one or more steps described herein and/or transmit control instructions to other systems and devices to cause the systems and devices to perform specific tasks.

As illustrated in FIG. 1, the recipient system 106 is connected to the processing system 108 and may be associated with a financial institution network (e.g., a recipient bank for an account transfer electronic activity). The recipient system 106 may refer to a financial institution system, a transaction terminal or other devices or systems associated with performing the sure activity. In this way, while only one recipient system 106 is illustrated in FIG. 1, it is understood that multiple network systems may make up the system environment 100. In some embodiments, the recipient system 106 is substantially similar to the processing system 108. The recipient system 106 generally comprises a communication device 136, a processing device 138, and a memory device 140. The recipient system 106 comprises computer-readable instructions 142 stored in the memory device 140, which in one embodiment includes the computer-readable instructions 142 of a finalization authorization application 144. In some embodiments, the processing system 108 (e.g., based on executing the application 158) transmits and/or causes the processing device 138 to install/store the finalization authorization application 144 on the recipient system 106. In some embodiments, the finalization authorization application 144, when executed by the processing device 138 is configured to cause the recipient system 106 to perform one or more steps described herein (e.g., decode and process inline activity data sets received from the processing system). In some embodiments, the finalization authorization application 144 is similar to the electronic activity processing application 158 described above. The recipient system 106 may communicate with the processing system 108 to receive static activity data sets, indicate processing of static activity data sets, indicate completion of an electronic activity, request validation of authentication credentials and the like. The processing system 108 may communicate with the recipient system 106 via a secure connection 160 generated for secure encrypted communications between the two systems. In some embodiments, the secure connection 160 may be an operative communication link/channel established via the network 101.

It is understood that the servers, systems, and devices described herein illustrate one embodiment of the invention. It is further understood that one or more of the servers, systems, and devices can be combined in other embodiments and still function in the same or similar way as the embodiments described herein. The feature of the invention will now be described with respect to FIG. 2 in conjunction with FIGS. 3A-3B and 4. FIG. 2 schematically depicts a high level process flow and processing environment 200 for dynamically appending and transforming static activity data of electronic activities, in accordance with some embodiments of the invention. FIGS. 3A and 3B schematically depict illustrative representations and processing environments 300A and 300B, respectively, of the dynamically appended and transformed static activity data in various situations, in accordance with some embodiments of the invention. FIG. 4 schematically depicts an illustrative representation 400 of a resource application user interface (e.g., first user interface 122a and/or second user interface 174a) of a resource application (e.g., first resource application 122 and/or second resource application 174) displayed on a user device (first networked device 104 and/or the second networked device 164), respectively, in accordance with some embodiments of the invention.

Referring now to FIG. 2, a high level process flow 200 is provided for dynamically appending and transforming static activity data transmitted to a user device application. The process flow and processing environment 200 is directed to, in general, a secure platform for dynamic restructuring and inter-connection of inline activity data, in-situ during finalization authorization of an electronic activity without requiring initialization of an additional electronic activity. In some embodiments, the "system" as used herein refers to the processing system 108, whose activities may be performed based on executing computer readable/executable instructions of the electronic activity processing application 158 by the processing device 148. In other embodiments, the "system" may refer to the first networked device 104 and/or the second networked device 164. FIG. 3A schematically depicts an illustrative representation and processing environment 300A of dynamically appending and transforming static activity data of electronic activities, in accordance with some embodiments of the invention. FIG. 3B schematically depicts an illustrative representation 300B and processing environment of dynamically appending and transforming static activity data of electronic activities, in accordance with some embodiments of the invention. FIG. 4 schematically depicts an illustrative representation 400 of a resource application user interface, in accordance with some embodiments of the invention. The steps, features and components of the invention for dynamically appending and transforming static activity data transmitted to a user device application will now be described in conjunction with FIGS. 2-4.

As illustrated by block 202 of FIG. 2, the system may receive (and/or retrieve) data associated with an electronic activity. Typically, a first user (or another system) may initiate the first electronic activity, for example, using a graphical user interface 122a of a first resource application 122 provided by the system on the first networked device 104. The system may then receive a first transmission indicating that a first user associated with the first networked device has requested finalization authorization of a first electronic activity. The system may then determine that the first electronic activity is associated with a first resource transfer from a second resource associated with a second user to a first resource associated with the first user, e.g., based on analyzing the transmission. For example, the first user may initiate the first electronic activity for requesting a payment from the second user. Here, the first electronic activity is in the form of a payment transfer and is typically associated with a first resource transfer of a resource magnitude (e.g., payment value or amount) from a second resource associated with a second user (e.g., an account of the second user) to a first resource associated with the first user (e.g., an account of the first user). The user may then provide activity parameters associated with the first electronic activity, such as time of the resource transfer, annotation items describing the reasons for requesting the transfer etc. As another example, the first user may initiate the first electronic activity for requesting one or more electronic resources or access to one of more electronic resources (e.g., electronic documents, electronic files, etc.) of the second user. Here, the first electronic activity is in the form of a payment transfer and is typically associated with a first resource transfer of a resource magnitude (e.g., transmission of one or more electronic files, providing access to one of more files, etc.) from a second resource associated with a second user (e.g., a device storage of the second user) to a first resource associated with the first user (e.g., a device storage of the first user). Moreover, the first networked device of the first user, for example, based on receiving instructions from a user, may transmit activity parameters to the system. These activity parameters may include location of the file, time of transmission, unique identifier of the source resource system, certificates of the target resource system, authentication information, and the like.

Typically, the first user interface 122a of the first application 122 is structured to allow the user to provide user inputs to initiate the first electronic activity and request finalization authorization of the activity from the first user interface 122a. It is noted that, the first application 122 is structured to allow the user to provide user inputs in the form of natural language, as text, speech, etc., and/or via operating one or more graphical elements (e.g., text boxes, action buttons, etc.) of the first user interface 122a. As an example, in the instance of utilizing the natural language form of inputs, the first user may merely provide a speech/audio input by saying or a textual input by typing "request finalization authorization an "A1" (resource magnitude) from "B2" (a second user) for "Cccccccc . . . " (e.g., description of the activity, reasons for requesting the resource transfer)."

In response to receiving user inputs to initiate the first electronic activity and request finalization authorization of the activity from the first user interface 122a, the first application 122 typically transmits the user inputs to the system as a first transmission. The system may then parse the received first transmission to determine the particulars of transmission, i.e., determine that that a first user associated with the first networked device has requested finalization authorization of a first electronic activity, and that the first electronic activity is associated with a first resource transfer from a second resource associated with a second user to a first resource associated with the first user. Continuing with the previous example of natural language input, the system may parse the user input in the natural language format to identify that the first user is requesting a resource transfer having an "A1" magnitude from a second user named "B2," for the purposes of "Cccccccc . . . ".

The system may then further analyze the first transmission to identify whether the transmission contains any additional activity parameters. If so, the system may extract the additional activity parameters. If the transmission does not contain activity parameters that are required for the finalization authorization or processing of the activity, the system may determine one or more activity parameters associated with the first electronic activity. Here, the system may determine activity parameters such as source account/resource unique identifier, target account/resource unique identifier, transfer amount (resource magnitude/resource value), date/time of the payment transfer electronic activity, authorization codes, and/or the like. Continuing with the previous example of natural language input, the system determine that a unique identifier of a first resource of the first user, and a unique identifier of a second resource of the second user named "B2" is required. In this regard, the system may determine these parameters, e.g., based on prior electronic activities of the user, user account information, based on requesting additional user inputs etc. Here, in some instances, the system may determine these parameters, based on the categorical context of "Cccccccc . . . " (e.g., description of the activity, reasons for requesting the resource transfer). For instance, "Cccccccc . . . " may indicate that the first user is requesting payment for yesterday's event, or baby-sitting services, gardening services, etc. rendered by the first user during a certain time interval of a certain day. Here, the system may review the first user's calendar, the first user's records, etc., based on receiving requisite permissions from the first user, and automatically determine the full name of the second user B2 and a unique identifier of a second resource of the second user.

The system may further determine that the second user is associated with a second networked device 164 (i.e., second user device), and in response establish an operative communication channel with the second networked device. Moreover, the system may determine whether the a second networked device comprises a second resource application 174 (i) that is a counterpart of the first resource application associated with the second user (e.g., a payment network application of the second user that is in the same payment network as that of the first resource application of the first user), and/or (ii) that is compatible with the transmissions from the first resource application (e.g., static activity data sets described below) and dynamic modification of the transmissions. If not, the system may initiate installation of the second resource application on the second networked device, e.g., after receiving requisite permissions from the second user.

Next, the system (the electronic activity processing application 158 in particular), may then construct a first static activity data set associated with the first electronic activity, as illustrated by block 204. The first static activity data set comprises a plurality of first activity parameter items associated with activity parameters associated with performing the first electronic activity. Typically, these activity parameter items are particulars associated with the first electronic activity which are required to perform the first electronic activity. As illustrated by FIGS. 3A-3B, the system may construct a first static activity data set 310 and store it at the first networked device 104. The first static activity data set 310 comprises a plurality of first activity parameter items 312, each relating to one or more activity parameters. The system may assign an activity identifier to uniquely identify the first electronic activity and construct a unique activity identifier parameter item 312a containing the activity identifier. The system may the construct another activity parameter item, a resource magnitude type activity parameter item 312b containing the resource value of the resource transfer (e.g., payment amount, number of documents, storage location of files, etc.). The system may also construct an activity parameter item indicating the second user, an activity parameter item indicating the second networked device of the second user, an activity parameter item indicating the unique identifier of the second user resource, and/or the like.

The system may further construct a first user annotation item 312c, typically containing a statement or comment or description input by the first user, typically in a natural language format as described above. In some embodiments, the system splices together the user input (e.g., "Cccccccc . . . " (e.g., description of the activity, reasons for requesting the resource transfer)) with activity parameters identified by the system to construct the first user annotation item 312*c*. For instance, the system determine that the user input description indicates that the resource transfer is associated with an event at a certain prior day. The system may then identify the location of the event, the duration, etc., and insert it at appropriate locations (e.g., at locations that result in a meaningful for a natural language) of the user input to construct the first user annotation item 312*c*.

The system may further construct a processing instruction annotation item that is structured to cause the second networked device to process the static activity data set differently that it would process other data. For instance, the system determine that the user input description indicates that the second user would prefer to receive the request for finalization authorization at a predetermined time interval in the future, or determine that a geographic location of the second user is associated with processing during a predetermined time interval in the future. The system may then construct a processing instruction that causes the second networked device of the second user to receive the transmission of the static activity data set, but not display or notify the user until predetermined time interval in the future. Here, the processing instruction causes the second resource application to run in the background until the predetermined time interval in the future, when it initiates presentation of the static data on a second user interface of the second resource application. In this manner, the static data may be sent to the second networked device ahead of time, such that even if the second networked device is offline or loses network connectivity at the predetermined time interval, the second resource application to running in the background is still able to display the static data received ahead of time. As another example, the system determine that the user input description indicates that the second user would prefer non-intrusive notifications. The system may then construct a processing instruction that causes the second networked device of the second user to receive the transmission of the static activity data set, but not display or notify the user when the user is not performing other tasks on the second networked device. Here, the processing instruction causes the second resource application to run in the background until it determines that the second user is not operating on any other applications before initiating presentation of the static data on a second user interface of the second resource application.

In some embodiments, the plurality of first activity parameter items 312 are constructed as disparate data structures that are linked together (e.g., with pointers), e.g., a linked list.

In some embodiments, the plurality of first activity parameter items 312 are constructed as a first activity data string in an activity data format. The activity data format typically comprises a syntax for constructing the activity parameters into the first activity data string. In some embodiments, some or all of the activity parameters are present in natural language or ordinary language in the first activity data string. The system may construct a first activity data string having N activity parameters items 312: "[first activity parameter 1] [first activity parameter 2] . . . [first activity parameter N]". As another example of electronic activity of a payment transfer, the activity parameter 1 maybe a source account unique identifier/number, the activity parameter 2 maybe a target account unique identifier/number, an activity parameter 3 maybe a transfer magnitude/amount value (e.g., resource magnitude type activity parameter item 312*b*), an activity parameter 4 maybe a time for payment transfer, an activity parameter 5 maybe an activity type code, an activity parameter 6 maybe the unique activity identifier parameter item 312*a*, and an activity parameter 7 maybe the first user annotation item 312*c* input by the first user. Typically, the activity parameters may be ordered/arranged, spaced, and/or separated by other alphanumeric or symbol characters in accordance with the syntax of the activity data format. In some embodiments, some or all of the activity parameters are present in alphanumeric characters of natural language in the first activity data string, and may be spaced apart, joined end to end, and/or separated using predetermined alphanumeric characters or predetermined symbol characters. For an electronic activity of the payment transfer, for example, the first activity data string may be: "aaaa111a bbbb222b 111.11 111111 cc". In some embodiments, the activity data format comprises a high-level programming language format, e.g., including activity parameters in natural language characters. In some embodiments, the activity data format comprises a low-level programming language format.

In some embodiments, for constructing the first activity data string, the system modifies at least one activity parameter associated with the first electronic activity received from a first networked device from the original parameters to a new modified parameter to obfuscate the data during transmission to enhance the security of the transmissions and to prevent interception by unauthorized individuals. The system then generates an authorization instruction that indicates the modification, which is encoded for transmission. The processing instruction comprises a predetermined method for altering the particular modified at least one activity parameter of the modified first activity data string for obtaining the original parameters and successfully performing the first electronic activity at the recipient system. Typically it is possible to determine the modification and reverse the modification to obtain the original activity parameters for processing only based on decoding the associated authorization instruction. Typically, the at least one activity parameter of the first activity data string is modified or altered such that processing the modified first activity data string having the modified at least one activity parameter, results in the recipient system unsuccessfully performing the first electronic activity. Continuing with the previous example, the system may modify the activity parameters such that all instances of character 1 are replaced with character 3, resulting in the first activity data string may of: "aaaa333a bbbb222b 333.33 333333 cc". An encoded authorization instruction, described below, maybe structured such that decoding the authorization instruction would indicate the substitution of the character 1 with 3 to the recipient system, which may then replace the character 3 with character 1 to obtain the original/correct parameters (i.e., aaaa111a bbbb222b 111.11 111111 cc) and process the payment transfer. Even if an unauthorized individual intercepts the data transmission and access the modified credentials (e g, aaaa333a, 333.33, 333333, the security of the original credentials is maintained. Typically, it is not possible to execute the payment transfer using the modified credentials (e.g., aaaa333a, 333.33, 333333). As another example, the system may modify the activity parameter 3 of the transfer amount value such that the decimal point is moved in a particular direction by 2 places, resulting in the modified activity parameter of 1.1111 and the first activity data string may of: "aaaa111a bbbb222b 1.1111 111111 cc".

In some embodiments, the first static activity data set (or the altered first static activity data set described below) associated with the first electronic activity is constructed as one or more line items of an inline activity data set. In some embodiments, the inline activity data set refers to a file or data packet that is transmitted to the recipient system for execution of the associated electronic activities. An inline activity data set may comprise activity data strings associated with one or more electronic activities and is configured such that processing the inline activity data set allows the recipient system to perform the associated one or more electronic activities.

The system, via the electronic activity processing application, may also generate a credential key pair for communications with the second networked device, and insert a key sub-component into the first static activity data set as another activity parameter item. The credential key pair comprises a source credential key sub-component (e.g., a private key) and a corresponding complementary target credential key sub-component (e.g., a public key). Typically, the source credential key sub-component and the target credential key sub-component are complementary asymmetric key pairs and their encoding is intrinsically linked. The target credential key-sub component is transmitted to the second networked device after generation. The key pairs are constructed such that the electronic activity data transmitted by the system (as described in detailed below) is encoded by the system using source credential key sub-component, and only the second networked device having the target credential key sub-component is able to decode the encoded activity data. In some embodiments, the generation and transmission of the key pairs is a one-time action performed during an initial communication with the recipient system, and are utilized to encode/decode subsequent data transmissions. In other embodiments, the key pairs are generated for each data transmission. In some embodiments, the source credential key sub-component and the target credential key sub-component of the credential key pair are similar to public and private keys utilized in a certificate signing request (CSR), respectively. In some embodiments, the source credential key sub-component and the target credential key sub-component of the credential key pair are structured in accordance with asymmetric public and private keys employed in public-key cryptography for communication between the system and the second networked device, respectively. In other embodiments, the source credential key sub-component and the target credential key sub-component of the credential key pair are structured in accordance with symmetric public and private keys of Pretty Good Privacy (PGP) encryption program for communication between the system and the capture device, respectively.

In some embodiments, the system generates, another activity parameter items having a specific or unique authorization instruction. The authorization instruction typically comprises at least one processing instruction (e.g., a data processing instruction, a permission instruction to indicate authorization for the electronic activity, a pointer instruction indicating a reference object of the associated activity data string, a data modification instruction to obtain original parameters, a predetermined method and/or the like) that is required for identifying and processing the associated activity data string and successfully performing the electronic activity at the recipient system and/or the second networked device.

The system then encodes each of the authorization instructions in the activity data format. For instance, the system encodes the first authorization instruction associated with the first electronic activity in the activity data format such that at least a portion of the first encoded authorization instruction matches the first activity data string associated with the first electronic activity. As alluded to previously, the authorization instruction is encoded, using the source credential key sub-component of the credential key pair described previously, to resemble an activity data string. The authorization instruction may typically take the form of technical instructions comprising line instructions, action objects, data/object operators, and/or other handles and syntax. These technical instructions are transformed to resemble an activity data string, and activity parameters in particular, such that the instructions may be decoded and the associated activity data string may be identified and processed correctly only using the target credential key sub-component at the second networked device.

The system may also generate a first authorization instruction associated with the first electronic activity for the recipient system, wherein the first authorization instruction comprises a processing instruction for the recipient system to perform the first electronic activity, and insert it into the first static activity data set 310.

The system may then transmit the constructed first static activity data set 310 to a second resource application 174 of the second networked device 164 associated with the second user 162, via the established operative communication link, as illustrated by transmission "A" of FIGS. 3A-3B. Moreover, the system may further store the first static activity data set 310 on the second networked device 164.

Now referring to FIG. 2, as illustrated by block 206, the system, e.g., based on executing computer readable instructions of the application 158, is configured to cause the second networked device to present, via a second user interface of the second resource application, the plurality of first activity parameter items of the first static activity data set on the second networked device associated with the second user. As described previously, this presentation may be based on the processing instruction parameter item present in the activity data set. Here, for example, the processing instruction may be structured to cause the second resource application to run in the background until a predetermined time interval in the future, at which time the application initiates presentation of the plurality of first activity parameter items of the first static activity data set on a second user interface of the second resource application. In this manner, the static data may be sent to the second networked device ahead of time, such that even if the second networked device is offline or loses network connectivity at the predetermined time interval, the second resource application to running in the background is still able to display the static data received ahead of time. As another example, the processing instruction may be structured to cause the second resource application to run in the background until it determines that the second user is not operating on any other applications before initiating presentation of the static data on a second user interface of the second resource application.

In some embodiments, the plurality of first activity parameter items of the first static activity data set first are first converted to a natural language format before presenting them on the second networked device associated with the second user, such as ""D" (first user) has requested finalization authorization of "A1" (resource magnitude)." In some embodiments, the first activity parameter items may be presented as graphical elements (e.g., icons, action buttons, etc.). Moreover, it is noted that the second user interface 174a of the second resource application 174 of the second networked device 164 is substantially similar to the first user interface 122a of the first resource application 122 of the first networked device 104 illustrated by FIG. 4.

Next, the system may also present, via a second user interface of the second resource application, a request for the second user to authorize the first electronic activity. In some embodiments this presentation may include a graphical element such as an action button, a toggle switch, a check box, etc., that is structured to receive a user input.

As discussed previously, as an additional advantage of the present invention, the system further allows the second user to alter/change/modify the static activity data of the first electronic activity and append the data with additional parameter items, without requiring initiation of another separate electronic activity with the modified parameters. In this regard, the system may present the plurality of first activity parameter items of the first static activity data set first such that, on or more of the parameter items may be altered by the second user via the second user interface, e.g., in the form of graphical elements that are structured to be modified, along with graphical import elements (e.g., text box files) or audio input elements for receiving additional parameter items from the second user.

Next, at block 208, the system may receive, via the second user interface of the second resource application, a first user input from the second user for altering a resource magnitude type activity parameter item (312b) of the plurality of first activity parameter items for the first electronic activity. For example, in the instances where the first activity is associated with a payment transfer of a resource magnitude (payment amount) from the second user, the system allows for the second user to modify the resource magnitude (payment amount), in-situ, while the first electronic activity is ongoing, without requiring initiation of another new activity with the new payment amount. Moreover, the first user input from the second user may further comprise a description or reason for the alteration in a natural language format.

In response to the receiving the second user input altering the resource magnitude type activity parameter item, the system constructs a new second activity parameter item 322b containing the altered resource magnitude type activity parameter item, i.e., the new magnitude/value of the resource magnitude type activity parameter item, as illustrated by FIGS. 3A-3B. The system then stores the new second activity parameter item 322b at the memory of second networked device 164, e.g., with a link/pointer to the memory location of the stored first static activity data set. Moreover, the system also constructs a new second user annotation item 322c containing the description or reason or other contextual input contained in the first user input from the second user. The system then also stores the new second user annotation item 322c at the memory of second networked device 164, e.g., with a link/pointer to the memory location of the stored second activity parameter item 322b and with a link/pointer to the memory location of the stored first static activity data set. As such, in response to the receiving the first user input from the second user, the system may construct at least one second activity parameter item associated with altering the resource magnitude type activity parameter item of the plurality of first activity parameter items.

The first user is typically required to validate the alterations to the first electronic activity. However, for decreasing the transmission time and increasing the processing speeds and for obviating the need for the first networked device to parse all of the incoming data to identify the relevant data elements, the system does not transmit all of the parameter items of the first electronic activity, but instead only transmits those parameter items that are not already stored at the first networked device. To achieve this, the system then constructs a second static activity data set associated with altering the resource magnitude type activity parameter item of the plurality of first activity parameter items for the first electronic activity, as indicated by block 210. As illustrated by FIGS. 3A-3B, the system may construct a second static activity data set 320. The second static activity data set 320 comprises only the those parameter items that are not already stored at the first networked device and the unique activity identifier of the first electronic activity in order for the first networked device to link the altered parameter items with already stored unaltered items in the first networked device. In this regard, the system extracts the unique activity identifier parameter item 312a from the stored first static activity data set 310 and appends it with the new or altered parameter items (e.g., the new second activity parameter item 322b, a second user annotation item 322c, etc.) to construct the second static activity data set 320. Here, the second static activity data set 320 typically comprises a plurality of second activity parameter items 322, comprising: the unique activity identifier parameter item 312a, the new second activity parameter item 322b, a second user annotation item 322c, etc. The second activity parameter item 322b is associated with the associated with altering the resource magnitude type activity parameter item based on the user input from the second user. The a second user annotation item 322c may be a statement or comment or description input by the second user indicating the modification to the resource magnitude, reasons for the modification, etc., typically in a natural language format. As such, the second static activity data set comprises at least (i) the at least one second activity parameter item associated with altering the resource magnitude type activity parameter item of the plurality of first activity parameter items, and (ii) a unique activity identifier parameter item of the plurality of first activity parameter items.

The system may then transmit the second static activity data set to the first resource application of the first networked device for alteration validation, as indicated by transmission B of FIGS. 3A-3B. The second static activity data set is structured to cause the first networked device to associate the second static activity data set with the first electronic activity based on identifying that the both the stored first static activity data set 310 and the received second static activity data set 320 comprise the unique activity identifier 312a. The device may then extract the second activity parameter item 322b from the received second activity data set 320, and determine that the resource magnitude of the first activity has been altered. In other words, the system may parse the second static activity data set to identify the unique activity identifier parameter item of the plurality of first activity parameter items. The system may then associate the second static activity data set with the first electronic activity. Here, the system may retrieve the constructed first static activity data set associated with the first electronic activity. The first static activity data set comprises the plurality of first activity parameter items comprising the resource magnitude type activity parameter item. Moreover, the system may subsequently present, via the first user interface of the first resource application, the at least one second activity parameter item associated with altering the resource magnitude type activity parameter item of the plurality of first activity parameter items to the first user. The system may also present, via the first user interface of the first resource application, a request for the alteration validation of the second static activity data set from the first user. Here, the system may present the plurality of first activity parameter items comprising the resource magnitude type activity parameter item.

The second static activity data set is structured to cause the first networked device to present the altered resource magnitude type activity parameter item to the first user, via a first user interface of the first resource application, as illustrated by FIG. 4. Here, as illustrated by FIG. 4, the system may present the presenting some of all of the plurality of first activity parameter items, such as the resource magnitude type activity parameter item 312b. The system may then overlay a presentation of the at least one second activity parameter item 322b along with a graphical link (e.g., a strike out of the item 312b to indicate that it is no longer current as illustrated by FIG. 4) to the presented the resource magnitude type activity parameter item 312b. The system may further present the second user annotation item 322c.

At block 360 of FIGS. 3A-3B, the system parses the second static activity data set associated with altering the resource magnitude type activity parameter item of the plurality of first activity parameter items for the first electronic activity, to determine whether the altered/new resource magnitude type activity parameter item 322b is associated with an (i) increase or (ii) decrease in the resource magnitude, and perform further processing accordingly, as will be described for each case below.

The first case of an increase in resource magnitude of the second activity parameter item is illustrated in FIG. 3A. Here, the second user may have added to the resource magnitude such that the resource magnitude of the second activity parameter item 322b is greater than that of the original resource magnitude parameter 312b. For example, the second user may have increased the payment amount requested by the first user or added a tip. Here, based on determining that the second activity data set is associated with an increase in the resource magnitude type activity parameter item, the system automatically transmits the alteration validation of the second static activity data set to the recipient system 108, for the recipient system to finalize the activity are perform the resource transfer.

The second case of a decrease in resource magnitude of the second activity parameter item is illustrated in FIG. 3B. Here, the second user may have reduced the resource magnitude such that the resource magnitude of the second activity parameter item 322b is lesser than that of the original resource magnitude parameter 312b. For example, the second user may have disputed the payment amount requested by the first user and suggested a lower amount. Here, based on determining that the second activity data set is associated with a decrease in the resource magnitude type activity parameter item, the system typically presents, via the first user interface of the first resource application, a request for the alteration validation of the second static activity data set from the first user.

In response, the system may receive, via the first user interface of the first resource application, a second user input from the first user either (a) accepting the reduced/decreased magnitude and hence providing the alteration validation of the second static activity data set, or (b) further altering the resource magnitude of the second activity parameter item. In instance (a). where the user providing the alteration validation of the second static activity data set, the control moves to block 212 described below. However, in the instance (b). where the first user alters the resource magnitude of the second activity parameter item, the system implements a negotiation dialogue function of the invention that allows for the first user and the second user in turn alter the resource magnitude until either alteration validation is provided by the first user or until the activity is terminated.

The first user may provide a second user input from the first user for altering the second static activity data set (e.g., by increasing the resource magnitude of the second activity parameter item 322b). In response, the system may construct a third static activity data set by altering the second static activity data set, in a manner substantially similar to the construction of the second activity data set described previously. As such, third static activity data set 330 associated with the first electronic activity typically comprises (i) the at least one third activity parameter item associated with the second user input for altering the at least one second activity parameter item, and (ii) the unique activity identifier parameter item 312a of the plurality of first activity parameter items, along with other parameter items such as first user annotation items etc.

The system then transmits the third static activity data set to the second resource application of the second networked device for approval from the second user, as indicated by transmission C. Similar to the manner described before, here the third static activity data set is structured to cause the second device to parse the third static activity data set to identify the unique activity identifier parameter item of the plurality of first activity parameter items, and then associating the third static activity data set with the first electronic activity. The transmission C of the third static activity data set is structured to present the third static activity data set to the second user, via the second user interface of the second resource application. The system may also present, via the first user interface of the first resource application, a request for the alteration validation of the second static activity data set from the first user.

Again, the second either further alters the resource magnitude, in which case the process proceeds in the same manner as described before until the second user provides a confirmation, or the second user provides a confirmation to the third static data set itself, as evaluated by the system at block 370. The system alters the first static activity data set in response to receiving a confirmation from the second user at the first device as indicated by transmission D, via the second user interface of the second resource application. The alteration of the first activity data set is described below.

Now referring to FIG. 2, at block 212, the system may alter the first static activity data set based on receiving an alteration validation of the second static activity data set from the first resource application of the first networked device. As indicated by block 212 of FIG. 2, the system may construct a final altered static activity data set 310' with the final activity parameter items. Here, the system may remove the resource magnitude type activity parameter item 312b of the plurality of first activity parameter items 312 from the first activity data set 310. The system may extract the second activity parameter item 322b from the second activity data set 320 (in the case of FIG. 3A) or the most recent activity parameter item from the most recent data set (in the case of FIG. 3B). The system may then append or insert the at least one second activity parameter item at a predetermined location in the plurality of first activity parameter items of the first activity data set, to construct the altered static activity data set 310', as illustrated by FIG. 3A. The system may then transmit this altered static activity data set 310' to the recipient system 108 for the recipient system to finalize the activity are perform the resource transfer, and also to the second networked device 164 to indicate that the activity has been finalized.

In some embodiments, altering the first static activity data set further comprises: receiving, via the first user interface of the first resource application, a second user input from the first user for altering the at least one second activity parameter item of the second static activity data set associated with altering the resource magnitude type activity parameter item of the plurality of first activity parameter items; in response to the receiving the second user input from the first user, constructing at least one third activity parameter item 322b associated with the second user input for altering the at least one second activity parameter item; constructing a third static activity data set associated with the first electronic activity, wherein the second static activity data set comprises (i) the at least one third activity parameter item associated with the second user input for altering the at least one second activity parameter item, and (ii) the unique activity identifier parameter item of the plurality of first activity parameter items; transmitting the third static activity data set to the second resource application of the second networked device, wherein the transmission of the third static activity data set is structured to present the at least one third activity parameter item to the second user, via the second user interface of the second resource application; and altering the first static activity data set in response to receiving a confirmation from the second user associated with the at least one third activity parameter item, via the second user interface of the second resource application, by: (i) removing the resource magnitude type activity parameter item of the plurality of first activity parameter items from the first activity data set; and (ii) appending the at least one third activity parameter item at a predetermined location in the plurality of first activity parameter items of the first activity data set.

Next at block 214, the system may transmit the altered first static activity data set 310' to the recipient system, wherein the first static activity data set, when processed, is structured to cause the recipient system to perform the first electronic activity based on the altered first static activity data set. Moreover, the system may present, to the first user via the first resource application and to the second user via the second resource application, a notification indicating the completion of the first electronic activity based on receiving an activity communication from the recipient system.

Moreover, the system may generate a second authorization instruction for the first electronic activity, wherein the second authorization instruction is structured to modify the processing instruction (describe previously) for the recipient system based on the altered first static activity data set. Here, the system may transmit the second authorization instruction for the first electronic activity to the recipient system as well. The second authorization instruction is structured such that, when processed, is structured to cause the recipient system to perform the first electronic activity based on the altered first static activity data set at not the first static activity data set 310.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for dynamically appending and transforming static activity data transmitted to a user device application, wherein the system is configured for dynamic restructuring and inter-connection of inline activity data, in-situ during finalization authorization of an electronic activity without requiring initialization of an additional electronic activity, the system comprising:
   at least one memory device having executable instructions stored thereon;
   at least one communication device connected to a distributed network;
   at least one processing device operatively coupled to the at least one memory device wherein the at least one processing device is configured to execute the executable instructions to:
      determine, based on receiving a first transmission from a first resource application of a first networked device, that a first user associated with the first networked device has requested finalization authorization of a first electronic activity, wherein the first electronic activity is associated with a first resource transfer from a second resource associated with a second user to a first resource associated with the first user;
      construct a first static activity data set associated with the first electronic activity, wherein the first static activity data set comprises a plurality of first activity parameter items;
      transmit the first static activity data set to a second resource application of the second networked device associated with the second user;
      present, via a second user interface of the second resource application, the plurality of first activity parameter items of the first static activity data set on the second networked device associated with the second user;
      receive, via the second user interface of the second resource application, a first user input from the second user for altering a resource magnitude type activity parameter item of the plurality of first activity parameter items for the first electronic activity;
      in response to the receiving the second user input, construct a second static activity data set associated with altering the resource magnitude type activity parameter item of the plurality of first activity parameter items for the first electronic activity;
      transmit the second static activity data set to the first resource application of the first networked device, wherein the transmission of the second static activity data set is structured to present the altered resource magnitude type activity parameter item to the first user, via a first user interface of the first resource application;
      alter the first static activity data set based on receiving an alteration validation of the second static activity data set from the first resource application of the first networked device;
      transmit the altered first static activity data set to the recipient system, wherein the first static activity data set is structured to cause the recipient system to perform the first electronic activity based on the altered first static activity data set; and
      present, to the first user via the first resource application and to the second user via the second resource application, a notification indicating the completion of the first electronic activity based on receiving an activity communication from the recipient system.

2. The system of claim 1, wherein altering the first static activity data, further comprises:
   parsing the second static activity data set associated with altering the resource magnitude type activity parameter item of the plurality of first activity parameter items for the first electronic activity; and
   based on determining that the second activity data set is associated with an increase in the resource magnitude type activity parameter item, automatically transmitting the alteration validation of the second static activity data set.

3. The system of claim 1, wherein altering the first static activity data set, further comprises:
   parsing the second static activity data set associated with altering the resource magnitude type activity parameter item of the plurality of first activity parameter items for the first electronic activity; and
   based on determining that the second activity data set is associated with a decrease in the resource magnitude type activity parameter item, presenting, via the first user interface of the first resource application, a request for the alteration validation of the second static activity data set from the first user.

4. The system of claim 3, wherein altering the first static activity data set further comprises:
receiving, via the first user interface of the first resource application, a second user input from the first user for altering the second static activity data set, in response to presenting the request for the alteration validation of the second static activity data set from the first user;
in response to the receiving the second user input, constructing a third static activity data set by altering the second static activity data set;
transmitting the third static activity data set to the second resource application of the second networked device, wherein the transmission of the third static activity data set is structured to present the third static activity data set to the second user, via the second user interface of the second resource application; and
altering the first static activity data set in response to receiving a confirmation from the second user, via the second user interface of the second resource application.

5. The system of claim 1, wherein constructing the second static activity data set associated with altering the resource magnitude type activity parameter item of the plurality of first activity parameter items further comprises:
in response to the receiving the first user input from the second user, constructing at least one second activity parameter item associated with altering the resource magnitude type activity parameter item of the plurality of first activity parameter items;
constructing the second static activity data set associated with the first electronic activity, wherein the second static activity data set comprises (i) the at least one second activity parameter item associated with altering the resource magnitude type activity parameter item of the plurality of first activity parameter items, and (ii) a unique activity identifier parameter item of the plurality of first activity parameter items.

6. The system of claim 5, wherein altering the first static activity data set further comprises:
removing the resource magnitude type activity parameter item of the plurality of first activity parameter items from the first activity data set; and
appending the at least one second activity parameter item at a predetermined location in the plurality of first activity parameter items of the first activity data set.

7. The system of claim 5, wherein presenting the altered resource magnitude type activity parameter item to the first user, via the first user interface of the first resource application, further comprises:
parsing the second static activity data set to identify the unique activity identifier parameter item of the plurality of first activity parameter items;
associating the second static activity data set with the first electronic activity;
presenting, via the first user interface of the first resource application, the at least one second activity parameter item associated with altering the resource magnitude type activity parameter item of the plurality of first activity parameter items to the first user; and
presenting, via the first user interface of the first resource application, a request for the alteration validation of the second static activity data set from the first user.

8. The system of claim 7:
wherein associating the second static activity data set with the first electronic activity further comprises: retrieving the constructed first static activity data set associated with the first electronic activity, wherein the first static activity data set comprises the plurality of first activity parameter items comprising the resource magnitude type activity parameter item; and
wherein presenting, via the first user interface of the first resource application, the at least one second activity parameter item further comprises:
presenting the plurality of first activity parameter items comprising the resource magnitude type activity parameter item; and
overlaying a presentation of the at least one second activity parameter item comprising a graphical link to the presented the resource magnitude type activity parameter item.

9. The system of claim 5, wherein altering the first static activity data set further comprises:
receiving, via the first user interface of the first resource application, a second user input from the first user for altering the at least one second activity parameter item of the second static activity data set associated with altering the resource magnitude type activity parameter item of the plurality of first activity parameter items;
in response to the receiving the second user input from the first user, constructing at least one third activity parameter item associated with the second user input for altering the at least one second activity parameter item;
constructing a third static activity data set associated with the first electronic activity, wherein the second static activity data set comprises (i) the at least one third activity parameter item associated with the second user input for altering the at least one second activity parameter item, and (ii) the unique activity identifier parameter item of the plurality of first activity parameter items;
transmitting the third static activity data set to the second resource application of the second networked device, wherein the transmission of the third static activity data set is structured to present the at least one third activity parameter item to the second user, via the second user interface of the second resource application; and
altering the first static activity data set in response to receiving a confirmation from the second user associated with the at least one third activity parameter item, via the second user interface of the second resource application, by:
removing the resource magnitude type activity parameter item of the plurality of first activity parameter items from the first activity data set; and
appending the at least one third activity parameter item at a predetermined location in the plurality of first activity parameter items of the first activity data set.

10. The system of claim 9, wherein the at least one third activity parameter item to the second user, via the second user interface of the second resource application, further comprises:
parsing the third static activity data set to identify the unique activity identifier parameter item of the plurality of first activity parameter items;
associating the third static activity data set with the first electronic activity;
presenting, via the first user interface of the first resource application, the at least one second activity parameter item associated with altering the resource magnitude type activity parameter item of the plurality of first activity parameter items to the first user; and presenting, via the first user interface of the first resource application, a request for the alteration validation of the second static activity data set from the first user.

11. The system of claim 1, wherein constructing the first static activity data set associated with the first electronic activity further comprises:
storing the first static activity data set comprising the plurality of first activity parameter items at a first memory device of the first networked device; and
generating a first authorization instruction associated with the first electronic activity for the recipient system, wherein the first authorization instruction comprises a processing instruction for the recipient system to perform the first electronic activity.

12. The system of claim 11, wherein transmitting the altered first static activity data set to the recipient system further comprises:
generating a second authorization instruction for the first electronic activity, wherein the second authorization instruction is structured to modify the processing instruction for the recipient system based on the altered first static activity data set; and
transmitting the second authorization instruction for the first electronic activity to the recipient system, wherein the second authorization instruction is structured to cause the recipient system to perform the first electronic activity based on the altered first static activity data set.

13. The system of claim 1, wherein the plurality of first activity parameter items of the first static activity data set associated with the first electronic activity comprise a first user annotation item, wherein the first user annotation item is input by the first user, wherein the first user annotation item is in a natural language format.

14. The system of claim 1, wherein the second static activity data set associated with the first electronic activity comprises a second user annotation item, wherein the second user annotation item is input by the second user, wherein the second user annotation item is in a natural language format.

15. A computerized method for dynamically appending and transforming static activity data transmitted to a user device application, wherein the computerized method is configured for dynamic restructuring and inter-connection of inline activity data, in-situ during finalization authorization of an electronic activity without requiring initialization of an additional electronic activity, the computerized method comprising a non-transitory computer-readable storage medium having computer-executable instructions to:
determining, based on receiving a first transmission from a first resource application of a first networked device, that a first user associated with the first networked device has requested finalization authorization of a first electronic activity, wherein the first electronic activity is associated with a first resource transfer from a second resource associated with a second user to a first resource associated with the first user;
constructing a first static activity data set associated with the first electronic activity, wherein the first static activity data set comprises a plurality of first activity parameter items;
transmitting the first static activity data set to a second resource application of the second networked device associated with the second user;
presenting, via a second user interface of the second resource application, the plurality of first activity parameter items of the first static activity data set on the second networked device associated with the second user;
receiving, via the second user interface of the second resource application, a first user input from the second user for altering a resource magnitude type activity parameter item of the plurality of first activity parameter items for the first electronic activity;
in response to the receiving the second user input, constructing a second static activity data set associated with altering the resource magnitude type activity parameter item of the plurality of first activity parameter items for the first electronic activity;
transmitting the second static activity data set to the first resource application of the first networked device, wherein the transmission of the second static activity data set is structured to present the altered resource magnitude type activity parameter item to the first user, via a first user interface of the first resource application;
altering the first static activity data set based on receiving an alteration validation of the second static activity data set from the first resource application of the first networked device;
transmitting the altered first static activity data set to the recipient system, wherein the first static activity data set is structured to cause the recipient system to perform the first electronic activity based on the altered first static activity data set; and
presenting, to the first user via the first resource application and to the second user via the second resource application, a notification indicating the completion of the first electronic activity based on receiving an activity communication from the recipient system.

16. The computerized method of claim 15, wherein altering the first static activity data, further comprises:
parsing the second static activity data set associated with altering the resource magnitude type activity parameter item of the plurality of first activity parameter items for the first electronic activity; and
based on determining that the second activity data set is associated with an increase in the resource magnitude type activity parameter item, automatically transmitting the alteration validation of the second static activity data set.

17. The computerized method of claim 15, wherein altering the first static activity data set, further comprises:
parsing the second static activity data set associated with altering the resource magnitude type activity parameter item of the plurality of first activity parameter items for the first electronic activity; and
based on determining that the second activity data set is associated with a decrease in the resource magnitude type activity parameter item, presenting, via the first user interface of the first resource application, a request for the alteration validation of the second static activity data set from the first user.

* * * * *